(12) United States Patent
Watts et al.

(10) Patent No.: US 11,636,748 B2
(45) Date of Patent: Apr. 25, 2023

(54) ARTIFICIAL INTELLIGENCE FOR EVENT RESPONSE

(71) Applicant: Becklar, LLC, Ogden, UT (US)

(72) Inventors: Richard Andrew Watts, Layton, UT (US); Justin Gibson Bailey, North Ogden, UT (US); Brian Craig Willoughby, Layton, UT (US)

(73) Assignee: Becklar, LLC, Ogden, UT (US)

( * ) Notice: Subject to any disclaimer, the term of this patent is extended or adjusted under 35 U.S.C. 154(b) by 0 days.

(21) Appl. No.: 17/651,778

(22) Filed: Feb. 18, 2022

(65) Prior Publication Data

US 2022/0270461 A1 Aug. 25, 2022

Related U.S. Application Data

(60) Provisional application No. 63/152,257, filed on Feb. 22, 2021.

(51) Int. Cl.
*G08B 21/02* (2006.01)
*G08B 27/00* (2006.01)
*G06F 18/2431* (2023.01)

(52) U.S. Cl.
CPC ......... *G08B 21/02* (2013.01); *G06F 18/2431* (2023.01); *G08B 27/001* (2013.01)

(58) Field of Classification Search
CPC .................................................... G08B 21/02
See application file for complete search history.

(56) References Cited

U.S. PATENT DOCUMENTS

| | | | |
|---|---|---|---|
| 6,398,727 B1 | 6/2002 | Bui et al. | |
| 9,257,029 B1 | 2/2016 | Hendrick, III et al. | |
| 10,722,185 B2 | 7/2020 | Fountaine | |
| 11,020,064 B2 | 6/2021 | Fountaine | |
| 2015/0161882 A1* | 6/2015 | Lett | G08B 25/001 340/506 |
| 2016/0292374 A1* | 10/2016 | Hutchins | H04L 67/12 |
| 2021/0038170 A1 | 2/2021 | Fountaine | |
| 2021/0044673 A1 | 2/2021 | MacGabann | |
| 2021/0153818 A1 | 5/2021 | Fountaine | |
| 2021/0196209 A1 | 7/2021 | Fountaine | |

FOREIGN PATENT DOCUMENTS

WO   WO/2018/208904 A1   11/2018

OTHER PUBLICATIONS

International Search Report and Written Opinion, as issued in connection with International Patent Application No. PCT/US22/70769, dated May 23, 2022, 7 pgs.

* cited by examiner

*Primary Examiner* — Travis R Hunnings
(74) *Attorney, Agent, or Firm* — Maschoff Brennan; Paul G. Johnson

(57) ABSTRACT

A method for artificial intelligence (AI) event response includes receiving an event alert or a communication associated with an event alert from a communication device. The method includes an AI system collecting additional information about at least one of the event alert, the communication device, or a user of the communication device. The method includes the AI system categorizing the event alert into one category of multiple categories based on the collected additional information. The method includes prioritizing subsequent handling of the event alert among other event alerts based on the category.

9 Claims, 4 Drawing Sheets

ARTIFICIAL INTELLIGENCE FOR EVENT RESPONSE

CROSS-REFERENCE TO RELATED APPLICATIONS

This application claims priority to U.S. Provisional Application 63/152,257 filed on Feb. 22, 2021, which is incorporated herein by reference in its entirety.

FIELD

The embodiments discussed herein are related to artificial intelligence (AI) for event response.

BACKGROUND

Unless otherwise indicated herein, the materials described herein are not prior art to the claims in the present application and are not admitted to be prior art by inclusion in this section.

A medical alarm is an alarm system designed to signal the presence of a hazard requiring urgent attention and to summon emergency medical personnel. Communication devices deployed in such systems for users are commonly referred to as Personal Emergency Response System (PERS) devices or medical alert devices. Such medical alert devices may also be referred to as mobile PERS (MPERS) devices depending on the capabilities. Elderly people and disabled people who live alone commonly use PERS devices.

Typical PERS devices include a wireless pendant or transmitter with a button, sometimes referred to as an SOS button, that can be activated by a user of the PERS device in an emergency or when the user otherwise requires assistance. When the SOS button is activated by the user, the signal is transmitted to an alarm monitoring company's central station or call center, other emergency agency, or other programmed phone numbers. An operator or other individual at the call center, the emergency agency, or with the programmed phone number may assist the user remotely and/or may dispatch medical or other personnel to a location of the user to assist the user.

The subject matter claimed herein is not limited to embodiments that solve any disadvantages or that operate only in environments such as those described above. Rather, this background is only provided to illustrate one example technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, a method includes receiving an event alert or a communication associated with an event alert from a communication device. The method includes receiving identifying information of the communication device or a corresponding user. The method includes triggering an alarm in response to the event alert, the alarm effective to initiate an in person check of the communication device or the corresponding user indicated by the identifying information if not deactivated within a predetermined amount of time.

In another example embodiment, a method includes receiving an event alert or a communication associated with an event alert from a communication device. The method includes an AI system collecting additional information about at least one of the event alert, the communication device, or a user of the communication device. The method includes the AI system categorizing the event alert into one category of multiple categories based on the collected additional information.

In another example embodiment, a method includes receiving an event alert or a communication associated with an event alert from a communication device. The method includes an AI system collecting additional information about at least one of the event alert, the communication device, or a user of the communication device. The method includes the AI system prioritizing subsequent handling of the event alert among other event alerts based on the collected additional information.

In another example embodiment, a method includes receiving an event alert or a communication associated with an event alert from a communication device. The method includes an AI system collecting additional information about at least one of the event alert, the communication device, or a user of the communication device. The method includes connecting the communication device to a response center. The method includes providing context of the event alert, the context including the collected additional information, to the response center.

In another example embodiment, a method includes receiving an event alert or a communication associated with an event alert from a communication device. The event alert includes identifying information of the communication device or the corresponding user. An alarm is triggered in response to the event alert. The alarm is effective to initiate an in person check of the communication device or the corresponding user indicated by the identifying information if not deactivated within a predetermined amount of time. The method includes an AI system collecting additional information about at least one of the event alert, the communication device, or a user of the communication device. The method includes, in response to the collected additional information indicating the in person check is not necessary, deactivating the alarm within the predetermined amount of time.

In another example embodiment, a method includes receiving an event alert or a communication associated with an event alert from a communication device. The method includes an AI system collecting additional information about at least one of the event alert, the communication device, or a user of the communication device. The method includes the AI system categorizing the event alert into one category of multiple categories based on the collected additional information. The method includes prioritizing subsequent handling of the event alert among other event alerts based on the category.

In another example embodiment, a method includes receiving an event alert or a communication associated with an event alert from a communication device. The method includes receiving identifying information of the communication device or the user. The method includes triggering an alarm in response to the event alert, the alarm effective to initiate an in person check of the communication device or the user indicated by the identifying information if not deactivated within a predetermined amount of time. The method includes an AI system collecting information about at least one of the event alert, the communication device, or the user. The method includes the AI system categorizing the event alert into one category of multiple categories based on the category, and a third category. The method includes the AI system prioritizing subsequent handling of the event alert among other event alerts in dependence on the category, including one of: in response to the event alert being categorized in the first category, the AI system concluding the communication and deactivating the alarm within the predetermined amount of time; in response to the event alert being categorized in the second category that is different than the first category, the AI system concluding the communication, connecting the communication device to a queue of a response center behind calls of the third category, and providing the identifying information and context of the communication to the response center while leaving the alarm activated; or in response to the event alert being categorized in the third category that is different than each of the first category and the second category, the AI system concluding the communication, connecting the communication device to the queue of the response center in front of calls of the second category, and providing the identifying information and context of the communication to the response center while leaving the alarm activated.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

Figure 1:
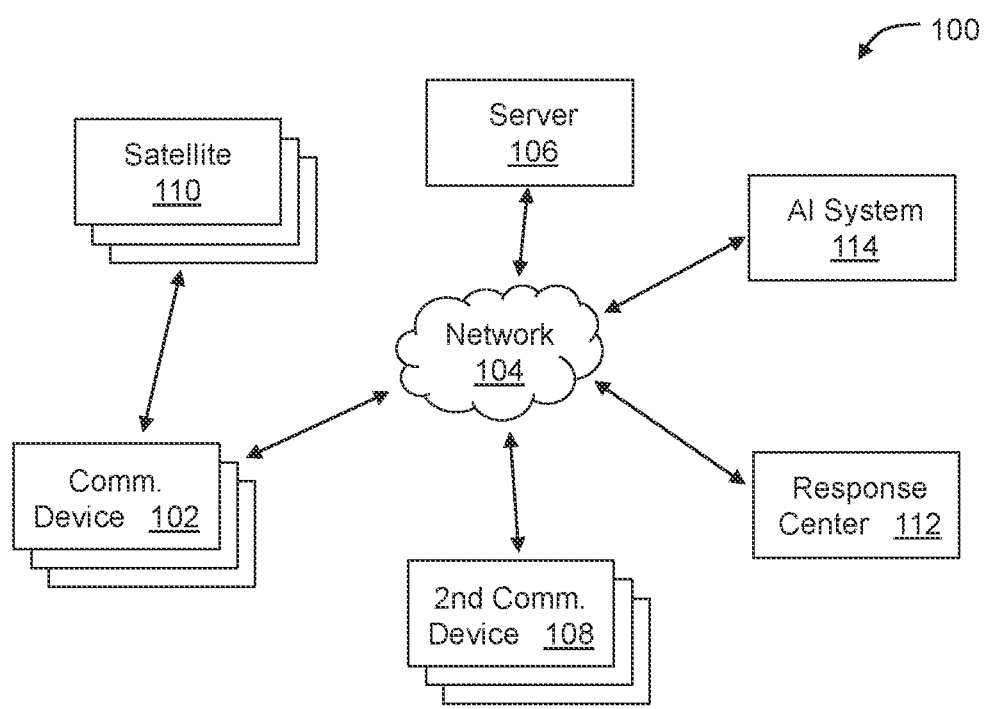
FIG. 1 depicts an example operating environment in which AI for event response may be implemented.

all arranged in accordance with at least one embodiment described herein.

DESCRIPTION OF EMBODIMENTS

Embodiments described herein are generally directed to AI for event response in communication systems with multiple communication devices. Event response in this context generally refers to responding to and addressing event alerts from communication devices that may require a response. As used herein, an "event" refers to a thing that has happened, e.g., in the real world. Further, an "event alert" refers to data reported to a call center or other event response center regarding an event that, if true (e.g., if the event has actually occurred), requires action to resolve or address the event. The action required to resolve or address the event may include, e.g., an in person check of a communication device, a user of the communication device, or a location or surroundings of the communication device. Alternatively or additionally, the action may include medical assistance, device repair, a reminder call or visit (e.g., to take a medication), or other action to resolve or address the event.

Medical alarm systems are one example communication system in which event response is implemented. For example, when a user's SOS button or other button of their PERS device is activated, this initiates a call to, e.g., a call center, the call being an example of or also triggering an event alert. Typically, the call is placed in a queue of the call center where a live operator answers the call. If the operator determines the user requires medical assistance or other assistance, the operator may dispatch emergency medical services (EMS) or take some other action(s) to assist the user.

Many of the incoming calls received at call centers in medical alarm systems are tests or false alarms. For example, when a PERS device is first provided to a user, the SOS button may be activated as a test to confirm the PERS device is working properly. As another example, with the PERS device worn by the user, e.g., as a pendant around a user's neck, the user may inadvertently activate the SOS button by, e.g., bumping the PERS device or SOS button against another object. With test calls and false alarms in the same queue as actual emergency calls, the handling of test calls and false alarm calls can delay assistance to users that may require immediate assistance.

Other examples of communication systems that may implement event response include Internet of Things (IoT) systems and security systems. Both systems may deploy sensors to, e.g., monitor a premises for toxic or hazardous chemicals or materials, intruders, the sound of glass breaking, or other event. When an event is detected, an event alert is generated and reported to a remote call center or other response center. An operator or other person at the response center may, e.g., collect additional information or dispatch EMS, a technician, or other individual(s) to make an in person visit or check of the premises and provide assistance, repairs, or other service(s), as needed. The term "response center" as used herein should be broadly construed to include any facility, office, phone, computer, etc. to which event alerts may be reported where an employee or other individual at or with access to the response center may provide, coordinate, or schedule assistance to address or respond to the event alert. Examples of response centers include call centers, doctor's offices, nurse's stations, hospitals, IoT device maintenance centers, and the like. Some examples described herein involve call centers but embodiments described herein may more generally be implemented with or in response centers, to the extent a call center or response center is needed.

In IoT and security systems, if the sensor has a suitable communicative interface, the sensor may send the event alert directly to a remote call center or other remote response center or may send a communication that is associated with the event alert, e.g., the communication may trigger or causes generation of the event alert. Alternatively, the sensor may have a more limited communication interface which is unable to communicate directly with a remote response center but is able to report to a local or onsite hub (e.g., a control panel in a home security system) that may then send the event alert or the communication associated with the event alert to the remote response center. Analogous to medical alarm systems, it is not uncommon for sensors or other communication devices in IoT and security systems to generate test event alerts or false alarm event alerts.

Another example communication system that may implement event response includes healthcare monitoring systems. Such systems may deploy sensors to, e.g., monitor or detect sounds, movements, or other behaviors or activities indicative of the user conforming to a healthcare plan (e.g., taking a prescribed medication, performing physical therapy, changing a bandage) or not conforming to the healthcare plan or of, e.g., the user's vital signs. When an event is detected, such as the user failing to take a prescribed medication by a predetermined time, an event alert may be generated and reported to a remote call center or other response center. A receptionist, nurse, other healthcare worker, or other person at the response center may, e.g., contact the user or visit the user to remind the user or assist the user in taking the prescribed medication.

Examples described herein implement AI combined in some embodiments with an interactive voice response (IVR) system to screen or filter event alerts in an event response system. As such, some embodiments may automatically process some event alerts, such as test event alerts, false alarm event alerts, or other event alerts that do not require human action to resolve or address the corresponding event, without involvement of live operators in the response center. Automatically processing such event alerts without involvement of the live operators in the response center effectively screens or filters incoming event alerts for events that are not true (and thus do not require human action to resolve or address) from reaching the call center which may in turn reduce a queue length at the response center and delays that may otherwise occur without the screen/filter.

IVR systems allow humans to interact with a computer-operated phone system through the use of voice or dual-tone multi-frequency signaling (DTMF). IVR systems typically follow set scripts that accept predefined inputs (e.g., "yes", "no", or selections from a list presented to the user) and are unable to accept or process natural language and thus are unable to have open-ended conversations with users. AI may be used to improve the abilities of an IVR system, e.g., to have open-ended conversations with users rather than accepting only predefined inputs.

To the instant inventors' knowledge, IVR systems with AI have not previously been implemented to screen or filter, e.g., test event alerts or false alarm event alerts in event response systems in which human action or intervention is required if an event is true. In such event response systems, the incorrect screening of a true event alert (e.g., an event alert for a true event) as a test event alert could potentially be fatal. For example, suppose a user of a PERS device is experiencing a critical medical emergency and activates the SOS button and the AI processes the call as a test event alert or false alarm event alert without connecting the user to the call center. Depending on the seriousness of the medical emergency, the user may be incapacitated very soon after activating the SOS button and unable to activate it again, or the delay until the user is able to initiate another call using the PERS device or some other device (e.g., telephone) may delay arrival of EMS, either of which could lead to serious injury or death of the user.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

FIG. 1 depicts an example operating environment 100 in which AI for event response may be implemented, arranged in accordance with at least one embodiment described herein. The environment 100 may generally include one or more of: communication devices 102 ("Comm. Device" in FIG. 1, hereinafter "devices 102"), a network 104, one or more servers 106, secondary communication devices 108 ("2nd Comm. Device" in FIG. 1, hereinafter "secondary devices 108"), satellites 110, response center 112, and AI system 114.

In general, the network 104 may include one or more wide area networks (WANs) and/or local area networks (LANs) that enable the devices 102, the server 106, the secondary communication devices 108, the response center 112, and the AI system 114 to communicate with each other. In some embodiments, the network 104 may include the Internet, including a global internetwork formed by logical and physical connections between multiple WANs and/or LANs. Alternately or additionally, the network 104 may include one or more cellular radio frequency (RF) networks, a voice over Internet Protocol (VOIP) service, a Voice over Long-Term Evolution (VoLTE) service, a public switched telephone network (PSTN), and/or one or more wired and/or wireless networks such as 802.xx networks, Bluetooth access points, wireless access points, Internet Protocol (IP)-based networks, or other wired and/or wireless networks. The network 104 may also include servers that enable one type of network to interface with another type of network.

Each of the devices 102 may include a Global Positioning System (GPS) receiver or other satellite receiver to receive signals from the satellites 110 to determine its location (e.g., longitude, latitude, and altitude/elevation). Accordingly, the satellites 110 may include or form a Global Navigation Satellite System (GNSS) such as the United States' GPS. In general, the satellites 110 provide radio signals to the devices 102 to allow calculation of three-dimensional location information, velocity, and timing.

Each of the devices 102 may include one or more sensors, such as a motion sensor (e.g., an accelerometer), a gyro, or other sensor(s). Alternatively or additionally, each of the devices 102 includes a communication interface to communicate with the server 106, the secondary devices 108, the response center 112, and/or the AI system 114 directly or over the network 104.

The devices 102 may include PERS devices, MPERS devices, mobile phones, smartphones, tablet computers, IoT devices, home security devices (e.g., glass-break sensors, window/door open/close sensors, control panels, etc.), or other communication devices that generate event alerts for corresponding events or that generate communications associated with event alerts, such as communications that trigger event alerts. Thus, event alerts may be included in communications, such as voice calls, texts, emails, chats, or other communications received from the devices 102. Alternatively or additionally, event alerts may be generated or triggered, e.g., at the server 106, the AI system 114, the response center 112, or other server, system, or device, in response to receiving communications from the devices 102.

The devices 102 may send the event alerts or the communications associated with the event alerts to the server 106, the response center 112, the AI system 114, or other servers, systems, or devices. The events may be identified and the event alerts initiated by a user or other person, e.g., a medical emergency, device test, or false alarm, by the user or other person intentionally or inadvertently activating an SOS button or other button(s) of the device 102. Alternatively or additionally, the events may be detected by the devices 102 themselves, such as detection of a fall of the user, a gas leak or leak of another substance, carbon monoxide (CO) or other gas or substance (e.g., smoke) concentration, glass break, door open, window open, or other events.

Alternatively or additionally, a communication may be initiated by a user or other person from the device 102 or by the device 102 itself and receipt of the communication at the server 106, the response center 112, the AI system 114, or other server, system, or device may trigger generation of a corresponding event alert by the recipient server, center, system, or device. In this example, the communication may be described as being associated with the subsequently triggered or created event alert and/or the event alert may be described as being associated with the communication that triggered it.

The server 106 may include one or more computer servers configured to provide one or more services to the devices 102 or users of the devices 102 through the network 104. For example, the server 106 may receive status reports from the devices 102, update configuration of the devices 102, or provide or facilitate monitoring services (e.g., emergency monitoring, security monitoring, other types of monitoring, etc.), emergency response services, and/or emergency information access services, etc.

The secondary devices 108 may include any appropriate device for communicating with the devices 102 directly or through the network 104. For example, each of the secondary devices 108 may include a smartphone, a tablet computer, a land line telephone, or other suitable communication device. The secondary devices 108 may also communicate with the server 106.

The response center 112 may include a call center, an alarm monitoring center, a security monitoring center, or other response center. Alternatively or additionally, the response center 112 may include servers, live operators, and/or other devices, systems, or entities to respond to event alerts received from the devices 102.

The AI system 114 may be operatively positioned between the devices 102 and the response center 112 to screen or filter incoming event alerts or associated communications from the devices 102 and may include an AI engine. In some embodiments, the AI system 114 additionally includes an IVR system that cooperates with the AI engine to facilitate voice communications between users of the devices 102 and the AI engine.

The devices 102 may communicate with the server 106, the secondary devices 108, the response center 112, and/or the AI system 114 wirelessly over the network 104. For example, the devices 102 may use any available cellular wireless standards or technologies, such as, Global System for Mobile communications (GSM), General Packet Radio Service (GPRS), Code-Division Multiple Access (CDMA), Wideband CDMA (WCDMA), Universal Mobile Telecommunications System (UMTS), third generation (3G) wireless mobile telecommunications technology, fourth generation (4G) wireless mobile telecommunications technology, Long-Term Evolution (LTE), LTE Advanced, or any other suitable wireless communication protocols to communicate with the server 106, the secondary devices 108, the response center 112, and/or the AI system 114. Alternatively or additionally, the devices may use any of the 802.11 wireless protocols or other wireless protocols to communicate with the server 106, the secondary devices 108, the response center 112, and/or the AI system 114 through an access point (AP), internet gateway, or the like which may be included as part of the network 104.

The server 106 may maintain various information, such as in a database, about the to preconfigured criteria, such as battery status of the corresponding device 102. In some embodiments, the server 106 may configure the devices 102 remotely.

As another example, the server 106 may set a status reporting period, or may set an event response handling entity (e.g., phone number. IP address, session initiation protocol (SIP) number) or an intended reporting entity for each of the devices 102 to communicate with. The response center 112 is an example of an event response handling entity. The secondary communication devices 108, which may be associated with or belong to caregivers or relatives of users of the devices 102, are examples of intended reporting entities. When an emergency event or other predetermined condition occurs or is detected, the corresponding device 102 may communicate with the response center 112 or the corresponding secondary device 108.

In some examples, when one of the devices 102 generates an event alert, a voice call or other communication may be established between the device 102 and the response center 112 to relay or supplement the event alert. The response center 112 may connect the AI system 114 to the communication. The AI system 114 may then perform one or more of the following: (1) trigger an alarm effective to initiate an in person check of the device 102 or a user of the device 102 if not deactivated within a predetermined amount of time, (2) collect additional information to understand the event alert and whether it is a true event alert, (3) prioritize the event alert among multiple event alerts, (4) provide context, including any collected additional information, to the response center 112, or (5) clear the alarm.

Alternatively or additionally, in response to detection of an event by the device 102 itself or in response to suitable operation of a user interface of the device 102 by a user or other person, the device 102 may communicate (e.g., via voice call, email, text, chat, etc.) with the response center 112. The response center 112 may connect the AI system 114 to the communication with the device 102. The AI system 114 may generate an event alert associated with the communication and may then perform one or more of (1)-(5) mentioned in the preceding paragraph.

An example method to trigger an alarm may include receiving an event alert or a communication associated with an event alert from any of the devices 102, e.g., at the response center 112 and/or the AI system 114. The method may include receiving, at the response center 112 and/or the AI system 114, a location of the device 102 or a corresponding user and identifying information of the device 102 or the corresponding user. For example, the location and identifying information may be received over a same communication channel as and with the event alert or communication or may be received through a different channel. The method may also include triggering the alarm in response to the event alert. The alarm may be effective to initiate an in person check of the device 102 or the corresponding user indicated by the identifying information and at the location if not deactivated within a predetermined amount of time. The triggering of the alarm may serve as a failsafe to cause the in person check to occur unless the AI system 114 and/or the response center 112 determines an in person check is not needed and deactivates the alarm.

An example method to collect additional information to understand an event alert may include receiving the event alert or the communication associated with the event alert from any of the devices, e.g., at the response center 112 and/or the AI system 114. The method may include the AI system 114 and/or the response center 112 collecting additional information about at least one of the event alert, the device 102, or the user of the device 102. For example, the AI system 114 may receive identifying information of the device 102 or user from the server 106. As another example, the AI system 114 may receive readings from the device 102 that may indicate its orientation, whether it detected a fall of the user, or other information. As another example, the AI system 114 may receive medical information of the user of the device 102, e.g., from the database 216 or other storage. As another example, the AI system 114 may initiate an open-ended conversation with the user through the device 102 to, e.g., determine an intent of the user, if any, in activating an SOS button of the device 102 that resulted in generation and transmission of the event alert or the communication associated with the event alert. The method may also include the AI system 114 categorizing the event alert into one of multiple categories based on the collected additional information.

An example method to prioritize event alerts may include receiving an event alert or a communication associated with the event alert from any of the devices 102, e.g., at the response center 112 and/or the AI system 114. The method may include the AI system 114 collecting additional information about at least one of the event alert, the communication device, or a user of the communication device, e.g., as described elsewhere herein. The method may include the AI system 114 prioritizing subsequent handling of the event alert among other event alerts based on the collected additional information. For example, the AI system 114 may categorize the event alert based on the collected additional information and may process event alerts assigned a first category with a higher or lower priority than event alerts assigned a second category.

An example method to provide context to the response center 112 may include receiving an event alert or a communication associated with the event alert from any of the devices 102, e.g., at the response center 112 and/or the AI system 114. The method may include the AI system 114 collecting additional information about at least one of the event alert, the device 102, or the user, e.g., as described elsewhere herein. The method may include connecting the device 102 to the response center 112 and in particular to a live operator at the response center 112. The method may include providing context of the event alert, the context including the collected additional information, to the response center 112. Providing the context to the response center 112 may provide the live operator with more information than the live operator would otherwise have up front, permitting the live operator to simply confirm the information in the provided context or otherwise streamline a conversation with the user to provide the user assistance or otherwise respond to or address the event as quickly as possible.

An example method to clear an alarm may include receiving an event alert or a communication associated with the event alert from any of the devices 102, e.g., at the response center 112 and/or the AI system 114. The event alert or the communication may include a location of the device 102 or corresponding user and identifying information of the device 102 or the corresponding user. An alarm may be triggered in response to the event alert; the alarm may be triggered by the AI system 114, the response center 112, or other device, system, or entity. The alarm may be effective to initiate an in person check of the communication device or the corresponding user indicated by the identifying information and at the location if not deactivated within a predetermined amount of time. The method may include the AI system 114 collecting additional information about at least one of the event alert, the device 10, or the user, e.g., as described elsewhere herein. The method may include, in response to the collected additional information indicating the in person check is not necessary, deactivating the alarm within the predetermined amount of time and without involvement of a live operator at the response center 112.

Figure 2:
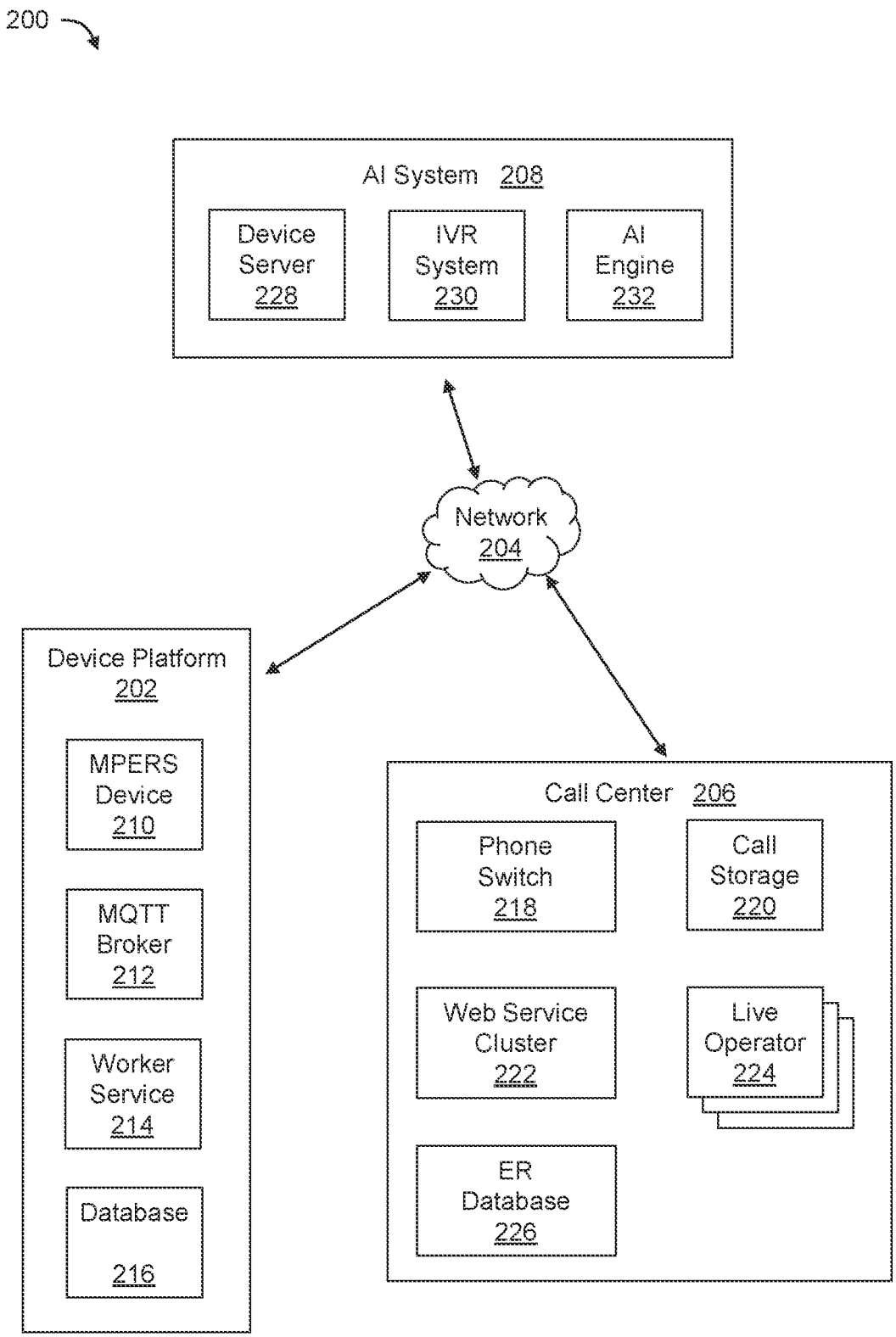
FIG. 2 depicts another example operating environment in which AI for event response may be implemented.

FIG. 2 depicts another example operating environment 200 in which AI for event response may be implemented, arranged in accordance with at least one embodiment described herein. The environment 200 includes a specific implementation or example of the environment 100 of FIG. 1. As illustrated, the environment 200 includes a device platform 202, a network 204, a call center 206, and an AI system 208.

The device platform 202 includes an MPERS device 210 (more generally multiple MPERS devices 210), a Message Queuing Telemetry Transport (MQTT) broker 212, a worker service 214, and a database 216. The MPERS device 210 is one example implementation of the devices 102 of FIG. 1 and may belong to, be used by, or otherwise be associated with a user. The MQTT broker 212, the worker service 214, and/or the database 216 are one example implementation of the server 106 of FIG. 1.

The call center 206 includes a phone switch 218, call storage 220, a web service cluster 222, live operators 224, and an event response database 226 ("ER Database" in FIG. 2, hereinafter "ER database 226"). The call center 206 is one example implementation of the response center 112 of FIG. 1.

The AI system 208 includes a device server 228, an IVR system 230, and an AI engine 232. The AI system 208 is one example implementation of the AI system 114 of FIG. 1.

In operation, the MPERS device 210 may send status to the database 216, e.g., periodically, such as daily, anytime a call is initiated by activation of the SOS button of the MPERS device 210, and/or at other times. The status may include a current location or last known location of the MPERS device 210 and/or the user, a current orientation of the MPERS device 210 (e.g., as measured by one or more accelerometers, gyros, or other sensors), an operating mode of the MPERS device 210 (e.g., test mode, normal operating mode). The status may be saved in the database 216.

The MQTT broker 212 is a server that receives all messages from MQTT clients such as the MPERS device 210 and the worker server 214 and routes the messages to the appropriate destination clients. The MQTT broker 212 does not use device-specific addresses to route messages to destination clients but instead uses a subject line called "Topic" to route messages, and any MQTT client that wants a copy of the message and any other messages with that "Topic" in the subject line subscribes to that "Topic". The worker service 214 may subscribe to an event alert topic.

Accordingly, when the SOS button of the MPERS device 210 is activated, an event alert may be generated and sent by the MPERS device 210 to the MQTT broker 212 and then routed to the worker service 214 as a subscriber of the event alert topic. In response to the event alert, the worker server 214 may query the database 216 for information about the MPERS device 210 and/or the user. The queried information may include a location (e.g., GPS location, home address, or other location) of the MPERS device 210 and/or the user, identifying information (e.g., serial code or other unique ID, full name of the user, account number of the user, or other identifying information) of the MPERS device 210 and/or the user, and/or other information of the MPERS device 210 and/or the user (e.g., orientation of the MPERS device 210, medical information of the user) that may be stored in the database 216. The worker service 214 forwards the event alert, location, identifying information, and/or other information about the MPERS device 210 and/or the user to the call center 206, and in particular to the web service cluster 222.

The web service cluster 222 may compile the received information along with potentially other information in an event record that it saves in the ER database 226.

Activation of the SOS button of the MPERS device 210 also initiates a call through the network 204 between the MPERS device 210 and the call center 206, provided the call center 206 is set as the event response handling entity for the MPERS device 210. The incoming call from the MPERS device 210 specifically connects with the phone switch 218 and the phone switch 218 mirrors the call to the call storage 220, the IVR system 230, and the AI engine 232, essentially establishing a conference call between the user of the MPERS device 210 and the call storage 220, the IVR system 230, and the AI engine 232.

The call storage 220 records and stores audio of the call and of other calls from other MPERS devices 210. The audio recording of the call and audio recordings of other calls may be used to, e.g., train the AI engine 232.

The IVR system 230 may include any suitable IVR system such as the BLUEWORX voice response platform, or other suitable IVR system.

The AI engine 232 may include a conversational AI engine such as IBM WATSON, AMAZON LEX, GOOGLE DIALOGFLOW, NUANCE speech suite 11, or other suitable AI engine.

When the IVR system 230 receives the call, it opens a communication socket with the AI engine 232 and requests information from the device server 228, e.g., via API call, about the MPERS device 210 from which the call was initiated. The device server 228 requests and receives the information from the web service cluster 222. In particular, the device server 228 may request and receive some or all of the information the worker service 214 provided to the web service cluster 222. The device server 228 than provides the information to the IVR system 230, which in turn provides the information to the AI engine 232.

The device server 228 may also trigger, or invoke, an alarm, e.g., at the call center 206 and more particularly via the web service cluster 222, responsive to the event alert. The alarm may be effective to initiate an in person check of the MPERS device 210 or the user if not deactivated within a predetermined amount of time.

The AI engine 232 initiates an open-ended conversation with the user through the IVR system 230 and the MPERS device 210 to, e.g., determine an intent of the user in initiating the call. The AI engine 232 may use information about the user or the MPERS device 210 received from the device server 228, such as the user's name, age, location, device orientation, device operating mode, etc. to conduct the conversation and/or to determine the intent of the user. Further, the AI engine 232 may perform speech detection, voice-to-text conversion, natural language processing, and/or text-to-voice conversion to conduct the conversation.

The user may have any of various intents. For example, the user may have intentionally initiated the event alert or the call or other communication to test the MPERS device 210. As another example, the user may have unintentionally initiated the event alert or the call or other communication by inadvertently activating the SOS button. As another example, the user may intend to speak with one of the live operators 224 to request assistance for a non-medical or non-emergency event. As another example, the user may intend to speak with one of the live operators 224 to request assistance for a medical or emergency event.

Based on the information received from the device server 228 and the intent of the user or other information determined from the conversation, the AI engine 232 may categorize or classify the event alert into one of multiple categories. For example, a first category may be for event alerts where the user had no intent to initiate the alert or intended only to test the MPERS device and does not require any further assistance or desire to speak to any of the live operators 224. A second category may be for event alerts where the user intentionally or unintentionally initiated the event alert and desires to speak to one of the live operators 224 for a non-medical or non-emergency matter. A third category may be for event alerts where the user intentionally initiated the alert to request medical or emergency assistance. If the user is non-responsive during the conversation, e.g., due to a medical event, the AI engine 232 may categorize the event alert in the third category. Other embodiments may implement different or additional categories. For example, there may be different categories depending on the type of assistance requested or depending on the urgency of the assistance requested.

The AI system 208 may then prioritize subsequent handling of the event alert among other event alerts based on the category or more generally based on the information received from the device server 228 and the user's intent or other information determined from the conversation. For example, using the same categories just described, if the event alert is in the first category (e.g., test or false alarm and no desire to speak to live operator 224), the event alert may be closed and the call may be terminated, e.g., without connecting the MPERS device 202 to any of the live operators 224. Closing the event alert may include terminating the call and/or notifying the web service cluster 222 that the event alert has been addressed, e.g., by terminating the call without connecting to a live operator 224 because the event alert is in the first category. Some or all of the information provided to the web service cluster 222 in closing the event alert may be saved to the corresponding event record in the ER database 226.

If the event alert is in the second category (e.g., test or false alarm and user desires to speak to live operator 224), the MPERS device 202 may be connected in the call to a back of a live operator queue of the call center 206 to speak with one of the live operators 224 after the call advances through the live operator queue. The live operator queue may include calls for other event alerts. If the event alert is in the third category (e.g., user intentionally initiated request for medical assistance), the MPERS device 202 may be connected in the call to a front of the live operator queue or at least in front of calls for event alerts in the second category.

In both cases (second category or third category), one of the live operators 224 eventually joins the call with the user. The information collected to this point, e.g., by the AI system 208, and/or the categorization by the AI system 208 may be provided to the call center 206 as context for the call.

Some or all of the information may be presented to the corresponding live operator 224, e.g., on a monitor or display at a workstation of the live operator 224. This may streamline the process of the live operator 224 determining how to assist the user. If needed, the live operator 224 may dispatch EMS or other entity to perform an in person check of the user to provide medical or other assistance to the user. When the live operator 224 can provide no further assistance, the live operator 224 may close the event, e.g., by creating or updating the event record for the event alert in the ER database.

Figure 3:
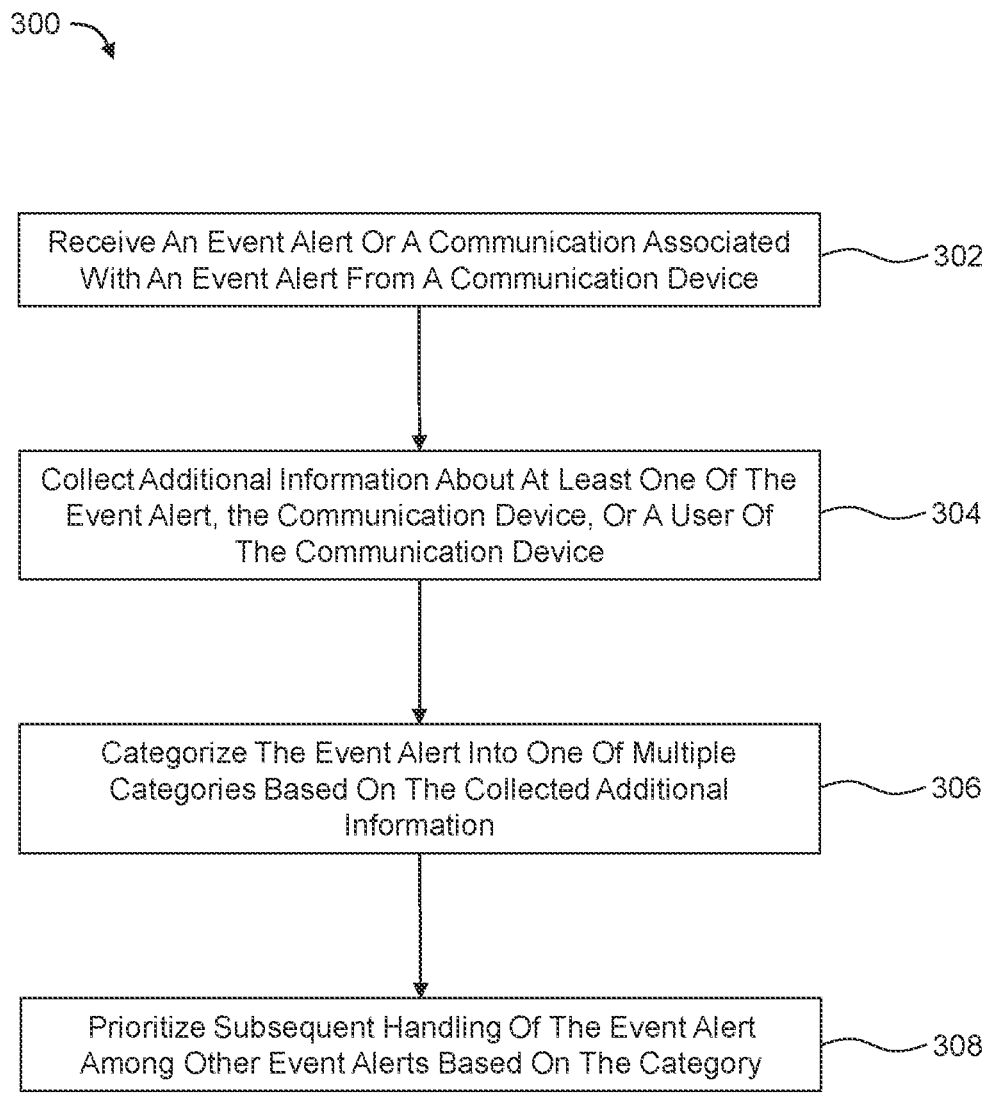
FIG. 3 is a flowchart of an example method to implement AI for event response.

FIG. 3 is a flowchart of an example method 300 to implement AI for event response, arranged in accordance with at least one embodiment described herein. The method 300 may be performed by one or more of the devices or systems described herein, such as the AI systems 114, 208 of FIGS. 1 and 2. In some embodiments, the method 300 may be embodied in code or other computer-readable instructions stored in a memory and executable by a processor to cause the processor to perform or control performance of one or more of the functions or operations of the method 300. The method 300 may include one or more of blocks 302, 304, 306, and/or 308.

At block 302, the method 300 may include receiving an event alert or a communication associated with an event alert from a communication device. For example, the AI system 114 or 208 of FIG. 1 or 2 may receive the event alert or the communication associated with the event alert from the device 102 or the MPERS device 210. The event alert may be generated in response to a communication device detecting an event, in response to initiation by a user of the communication device (e.g., activation by the user of an SOS button), in response to the communication, etc. In the example of FIG. 2, the event alert may be sent by the MPERS device 210 to the web service cluster 222 of the call center 206 and then from the web service cluster 222 to the device server 228 such that the AI system 208 receives the event alert. In an alternative implementation in FIG. 2, the communication associated with the (not-yet created) event alert may be sent by the MPERS device 210 to the web service cluster 222 of the call center 206 and then from the web service cluster 222 to the device server 228 such that the AI system 208 receives the communication and the AI system 208 may generate the event alert in response to the communication. The event alert may be for an event that, if true, requires human action to resolve or address. Block 302 may be followed by block 304.

At block 304, the method 300 may include collecting additional information about at least one of the event alert, the communication device, or a user of the communication device. For example, the AI system 114 or 208 of FIG. 1 or 2 may collect the additional information. In the example of FIG. 2, the collected additional information may include information (e.g., fall detection data, identifying information, medical information) about the event, the MPERS device 210, or the user that may be sent by the worker service 214 of the device platform 202 to the web service cluster 222 of the call center 206 and then from the web service cluster 222 to the device server 228. Alternatively or additionally, the collected additional information may include an intent of a user or other information determined by the AI engine 232 from an open-ended conversation with the user. Block 304 may be followed by block 306.

At block 306, the method 300 may include categorizing the event alert into one of multiple categories based on the collected additional information. For example, the AI system 114 or 208 of FIG. 1 or 2 may categorize the event alert into the category based on the collected additional information. Example categories and criteria for categorization are described elsewhere herein. Block 306 may be followed by block 308.

At block 308, the method 300 may include prioritizing subsequent handling of the event alert among other event alerts based on the category. Prioritizing subsequent handling of the event alert may include, in response to the category being a first category, closing the event alert without connecting the communication device to a live operator at a call center. Alternatively, prioritizing subsequent handling of the event alert may include, in response to the category being a second category different than the first category, connecting the communication device in a call to a back of a live operator queue of the call center, calls in the live operator queue being for other event alerts, and providing the collected additional information to the call center. Alternatively, prioritizing subsequent handling of the event alert may include, in response to the category being a third category different than each of the first category and the second category, connecting the communication device in a call to a front of the live operator queue (or more generally in the queue in front of calls of the first or second categories) and providing the collected additional information to the call center. For both the second and third categories, the collected additional information may be provided to the live operator that eventually connects to the call to aid the live operator in assisting the user.

The method 300 may further include receiving identifying information of the communication device or the user. In some embodiments, the identifying information may be received or collected as part of the block 304. A location of the communication device or the user may be provided by, e.g., the device platform 202 to the call center 206. Alternatively or additionally, the method 300 may further include triggering an alarm in response to the event alert, the alarm effective to initiate an in person check of at least one of the communication device or the user indicated by the identifying information and at the location if not deactivated within a predetermined amount of time.

In these and other implementations, prioritizing subsequent handling of the event alert at block 308 may include, in response to the category being a first category, closing the event alert and deactivating the alarm within the predetermined amount of time. Alternatively, prioritizing subsequent handling of the event alert at block 308 may include, in response to the category being a second category different than the first category, connecting the communication device to a back of a live operator queue of a call center (or more generally in the queue behind calls of the third category), calls in the live operator queue being for other event alerts, and providing the identifying information and context of the communication to the call center. The call center may also receive the location of the device or the user, e.g., from the device itself or from the device platform. The context of the communication may include any of the information collected and/or determined by the AI system. Alternatively, prioritizing subsequent handling of the event alert at block 308 may include, in response to the category being a third category different than each of the first category and the second category, connecting the communication device to the call center at a front of the live operator queue (or more generally in the queue in front of calls of the first or second categories) and providing the identifying information and context of the communication to the call center. For both the second and third categories, the collected additional information may be provided to the live operator that eventually connects to the call to aid the live operator in assisting the user.

The communication device in the method 300 of FIG. 3 may include a PERS device, an MPERS device, an IoT device, a home security system device, a mobile phone, a smartphone, a tablet computer, or other suitable communication device.

In an example, receiving the event alert from the communication device at block 302 may include receiving the event alert from an MPERS device responsive to initiation of the event alert by the user. Alternatively, receiving the communication associated with the event alert from the communication device at block 302 may include receiving the communication from an MPERS device responsive to initiation of the communication by the user. The method 300 may further include generating the event alert responsive to the communication and/or triggering an alarm in response to the event alert. The alarm may be effective to notify EMS to visit the user if not deactivated within a predetermined amount of time. Collecting the additional information at block 304 may include the AI system initiating an open-ended conversation with the user through the communication device and determining an intent of the user in initiating the event alert or the communication based on the open-ended conversation.

A specific implementation of the method 300 of FIG. 3 will now be described with reference to both FIGS. 2 and 3.

At block 302, the method 300 includes the AI system 208 receiving an event alert from the MPERS device 210, e.g., via the worker service 214, the web service cluster 222, and the device server 228.

The method 300 includes the AI engine 232 or other part(s) of the AI system 208 receiving identifying information of the MPERS device 210 or a user of the MPERS device 210, e.g., via the worker service 214, the web service cluster 222, and the device server 228. A location of the MPERS device 210 or the user may be received by, e.g., the web service cluster 222 of the call center 206 from the MPERS device 210, the worker service 214, and/or the database 216.

The method 300 includes the device server 228 or other part(s) of the AI system 208 triggering an alarm in response to the event alert. The alarm may be effective to initiate an in person check of the MPERS device 210 or the user indicated by the identifying information and at the location if not deactivated within a predetermined amount of time.

At block 304, the method 300 includes the AI engine 232 or other part(s) of the AI system 208 collecting information about at least one of the event alert, the MPERS device 210, or the user, e.g., by receiving the information from the web service cluster 222 or determining it from an open-ended conversation with the user.

At block 306, the method 300 includes the AI engine 232 or other part(s) of the AI system 208 categorizing the event alert into one of multiple categories based on the communication with the MPERS device 210.

At block 308, the method 300 includes the AI engine 232 or other part(s) of the AI system 208 prioritizing subsequent handling of the event alert among other event alerts in dependence on the category. Examples of such prioritization are described elsewhere herein.

One skilled in the art will appreciate that, for the method 300 and other processes and methods disclosed herein, the functions performed in the processes and methods may be implemented in differing order. Furthermore, the outlined steps and actions are only provided as examples, and some of the steps and actions may be optional, combined into fewer steps and actions, or expanded into additional steps and actions without detracting from the essence of the disclosed embodiments. Further, one or more of the steps or actions of any of the methods disclosed herein may be combined with one or more of the steps or actions of any of the other methods disclosed herein.

Figure 4:
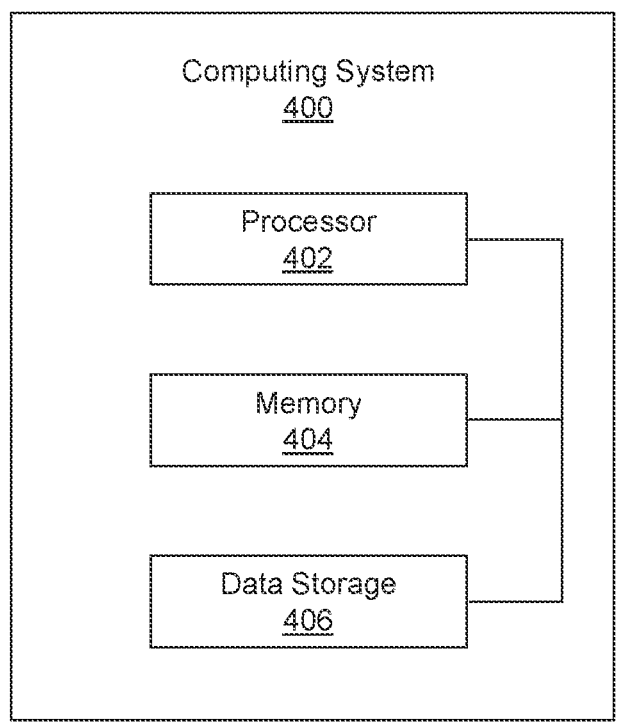
FIG. 4 illustrates a block diagram of an example computing system that may be used to perform or direct performance of one or more operations described according to at least one implementation of the present disclosure.

FIG. 4 illustrates a block diagram of an example computing system 400 that may be used to perform or direct performance of one or more operations described according to at least one implementation of the present disclosure. The computing system 400 may include, correspond to, or be included in any of the devices or systems herein, such as the MPERS device 202, the device server 228, the IVR system 230, the AI engine 232, or the web service cluster 222 of FIG. 2. The computing system 400 may include a processor 402, a memory 404, and a data storage 406. The processor 402, the memory 404, and the data storage 406 may be communicatively coupled.

In general, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute computer-executable instructions and/or to process data. Although illustrated as a single processor, the processor 402 may include any number of processors configured to, individually or collectively, perform or direct performance of any number of operations described in the present disclosure.

In some implementations, the processor 402 may be configured to interpret and/or execute computer-executable instructions and/or process data stored in the memory 404, the data storage 406, or the memory 404 and the data storage 406. In some implementations, the processor 402 may fetch computer-executable instructions from the data storage 406 and load the computer-executable instructions in the memory 404. After the computer-executable instructions are loaded into memory 404, the processor 402 may execute the computer-executable instructions.

The memory 404 and the data storage 406 may include computer-readable storage media for carrying or having computer-executable instructions or data structures stored thereon. Such computer-readable storage media may include any available media that may be accessed by a general-purpose or special-purpose computer, such as the processor 402. By way of example, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations.

Some portions of the detailed description refer to different modules configured to perform operations. One or more of the modules may include code and routines configured to enable a computing system to perform one or more of the operations described therewith. Additionally or alternatively, one or more of the modules may be implemented using hardware including any number of processors, microprocessors (e.g., to perform or control performance of one or more operations), DSPs, FPGAs, ASICs or any suitable combination of two or more thereof. Alternatively or additionally, one or more of the modules may be implemented using a combination of hardware and software. In the present disclosure, operations described as being performed by a particular module may include operations that the particular module may direct a corresponding system (e.g., a corresponding computing system) to perform. Further, the delineating between the different modules is to facilitate explanation of concepts described in the present disclosure. Further, one or more of the modules may be configured to perform more, fewer, and/or different operations than those described such that the modules may be combined or delineated differently than as described.

In general, all embodiments described herein can be freely combined, as applicable and if compatible. Further, the invention is not limited to the described embodiments, but can be varied within the scope of the enclosed claims.

Unless specific arrangements described herein are mutually exclusive with one another, the various implementations described herein can be combined in whole or in part to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The subject technology of the present invention is illustrated, for example, according to various aspects described below. Various examples of aspects of the subject technology are described as lettered claims (A, B, C, etc.) for convenience. These are provided as examples and do not limit the subject technology. It is noted that any of the dependent lettered claims or portions thereof may be combined in any combination, and placed into an independent lettered claim, e.g., Claims A, G, H, I, J, K, L. The other lettered claims can be presented in a similar manner. The following is a non-limiting summary of some examples presented herein.

A. A method, comprising receiving an event alert or a communication associated with an event alert from a communication device;

an artificial intelligence (AI) system collecting additional information about at least one of the event alert, the communication device, or a user of the communication device;

the AI system categorizing the event alert into one category of a plurality of categories based on the collected additional information; and prioritizing subsequent handling of the event alert among other event alerts based on the category.

B. The method of claim A, wherein prioritizing subsequent handling of the event alert comprises one of:

in response to the category being a first category, closing the event alert without connecting the communication device to a live operator at a response center;

in response to the category being a second category different than the first category, connecting the communication device in a call to a back of a live operator queue of the response center, calls in the live operator queue being for other event alerts, and providing the collected additional information to the response center; or in response to the category being a third category different than each of the first category and the second category, connecting the communication device in a call to a front of the live operator queue and providing the collected additional information to the response center.

C. The method of claim A, further comprising:

receiving identifying information of the communication device or the user; and triggering an alarm in response to the event alert, the alarm effective to initiate an in person check of at least one of the communication device or the user if not deactivated within a predetermined amount of time.

D. The method of claim C, wherein prioritizing subsequent handling of the event alert comprises one of:

in response to the category being a first category, closing the event alert and deactivating the alarm within the predetermined amount of time;

in response to the category being a second category different than the first category, connecting the communication device to a back of a live operator queue of a response center, calls in the live operator queue being for other event alerts, and providing the identifying information and context of the communication to the response center; or in response to the category being a third category different than each of the first category and the second category, connecting the communication device to the response center at a front of the live operator queue, and providing the identifying information and context of the communication to the response center.

E. The method of claim A, wherein the communication device comprises a personal emergency response system (PERS) device, a mobile PERS (MPERS) device, an Internet of Things (IoT) device, a home security system device, a mobile phone, a smartphone, or a tablet computer.

F. The method of claim A, wherein:
receiving the event alert or the communication from the communication device comprises receiving the event alert or the communication from a mobile personal emergency response system (MPERS) device responsive to initiation of the event alert or the communication by the user;
the method further includes triggering an alarm in response to the event alert, the alarm effective to notify emergency medical services (EMS) to visit the user if not deactivated within a predetermined amount of time; and
the AI system collecting the additional information includes the AI system initiating an open-ended conversation with the user through the communication device and determining an intent of the user in initiating the event alert based on the open-ended conversation.

G. A method, comprising
receiving an event alert or a communication associated with an event alert from a communication device;
receiving identifying information of the communication device or the user;
triggering an alarm in response to the event alert, the alarm effective to initiate an in person check of the communication device or the user indicated by the identifying information if not deactivated within a predetermined amount of time;
an artificial intelligence (AI) system collecting information about at least one of the event alert, the communication device, or the user;
the AI system categorizing the event alert into one category of a plurality of categories based on the communication with the communication device, the plurality of categories including a first category, a second category, and a third category; and
the AI system prioritizing subsequent handling of the event alert among other event alerts in dependence on the category, including one of:
in response to the event alert being categorized in the first category, the AI system concluding the communication and deactivating the alarm within the predetermined amount of time;
in response to the event alert being categorized in the second category that is different than the first category, the AI system concluding the communication, connecting the communication device to a queue of a response center behind calls of the third category, and providing the identifying information and context of the communication to the response center while leaving the alarm activated; or
in response to the event alert being categorized in the third category that is different than each of the first category and the second category, the AI system concluding the communication, connecting the communication device to the queue of the response center in front of calls of the second category, and providing the identifying information and context of the communication to the response center while leaving the alarm activated.

H. A method, comprising
receiving an event alert or a communication associated with an event alert from a communication device;
receiving identifying information of the communication device or a corresponding user; and
triggering an alarm in response to the event alert, the alarm effective to initiate an in person check of the communication device or the corresponding user indicated by the identifying information if not deactivated within a predetermined amount of time.

I. A method, comprising
receiving an event alert or a communication associated with an event alert from a communication device;
an artificial intelligence (AI) system collecting additional information about at least one of the event alert, the communication device, or a user of the communication device; and
the AI system categorizing the event alert into one category of a plurality of categories based on the collected additional information.

J. A method, comprising
receiving an event alert or a communication associated with an event alert from a communication device;
an artificial intelligence (AI) system collecting additional information about at least one of the event alert, the communication device, or a user of the communication device; and
the AI system prioritizing subsequent handling of the event alert among other event alerts based on the collected additional information.

K. A method, comprising
receiving an event alert or a communication associated with an event alert from a communication device;
an artificial intelligence (AI) system collecting additional information about at least one of the event alert, the communication device, or a user of the communication device;
connecting the communication device to a response center; and
providing context of the event alert, the context including the collected additional information, to the response center.

L. A method, comprising
receiving an event alert or a communication associated with an event alert from a communication device, wherein:
the event alert includes identifying information of the communication device or the corresponding user;
an alarm is triggered in response to the event alert;
the alarm is effective to initiate an in person check of the communication device or the corresponding user indicated by the identifying information if not deactivated within a predetermined amount of time;
an artificial intelligence (AI) system collecting additional information about at least one of the event alert, the communication device, or a user of the communication device; and
in response to the collected additional information indicating the in person check is not necessary, deactivating the alarm within the predetermined amount of time.

What is claimed is:
1. A method, comprising:
receiving an event alert or a communication associated with an event alert from a communication device;
an artificial intelligence (AI) system collecting additional information about at least one of the event alert, the communication device, or a user of the communication device, including the AI initiating an open-ended con- versation with the user through the communication device and determining an intent of the user or other information based on the open-ended conversation;

categorizing the event alert into one category of a plurality of categories based on the collected additional information; and prioritizing subsequent handling of the event alert among other event alerts based on the category.

2. The method of claim 1, wherein prioritizing subsequent handling of the event alert comprises one of:
  in response to the category being a first category, closing the event alert without connecting the communication device to a live operator at a response center;
  in response to the category being a second category different than the first category, connecting the communication device in a call to a back of a live operator queue of the response center, calls in the live operator queue being for other event alerts, and providing the collected additional information to the response center; or
  in response to the category being a third category different than each of the first category and the second category, connecting the communication device in a call to a front of the live operator queue and providing the collected additional information to the response center.

3. The method of claim 1, further comprising:
  receiving identifying information of the communication device or the user; and
  triggering an alarm in response to the event alert, the alarm effective to initiate an in person check of at least one of the communication device or the user if not deactivated within a predetermined amount of time.

4. The method of claim 3, wherein prioritizing subsequent handling of the event alert comprises one of:
  in response to the category being a first category, closing the event alert and deactivating the alarm within the predetermined amount of time;
  in response to the category being a second category different than the first category, connecting the communication device to a back of a live operator queue of a response center, calls in the live operator queue being for other event alerts, and providing the identifying information and context of the communication to the response center; or
  in response to the category being a third category different than each of the first category and the second category, connecting the communication device to the response center at a front of the live operator queue, and providing the identifying information and context of the communication to the response center.

5. The method of claim 1, wherein the communication device comprises a personal emergency response system (PERS) device, a mobile PERS (MPERS) device, an Internet of Things (IoT) device, a home security system device, a mobile phone, a smartphone, or a tablet computer.

6. A method, comprising:
  receiving an event alert or a communication associated with an event alert from a communication device, wherein receiving the event alert or the communication from the communication device comprises receiving the event alert or the communication from a mobile personal emergency response system (MPERS) device responsive to initiation of the event alert or the communication by the user;
  an artificial intelligence (AI) system collecting additional information about at least one of the event alert, the communication device, or a user of the communication device, wherein the AI system collecting the additional information includes the AI system initiating an open-ended conversation with the user through the communication device and determining an intent of the user in initiating the event alert based on the open-ended conversation;
  categorizing the event alert into one category of a plurality of categories based on the collected additional information;
  prioritizing subsequent handling of the event alert among other event alerts based on the category; and
  triggering an alarm in response to the event alert, the alarm effective to notify emergency medical services (EMS) to visit the user if not deactivated within a predetermined amount of time.

7. A method, comprising
  receiving an event alert or a communication associated with an event alert from a communication device;
  receiving identifying information of the communication device or the user;
  triggering an alarm in response to the event alert, the alarm effective to initiate an in person check of the communication device or the user indicated by the identifying information if not deactivated within a predetermined amount of time;
  an artificial intelligence (AI) system collecting information about at least one of the event alert, the communication device, or the user;
  categorizing the event alert into one category of a plurality of categories based on the collected information, the plurality of categories including a first category, a second category, and a third category; and
  the AI system prioritizing subsequent handling of the event alert among other event alerts in dependence on the category, including one of:
    in response to the event alert being categorized in the first category, the AI system concluding the communication and deactivating the alarm within the predetermined amount of time;
    in response to the event alert being categorized in the second category that is different than the first category, the AI system concluding the communication, connecting the communication device to a queue of a response center behind calls of the third category, and providing the identifying information and context of the communication to the response center while leaving the alarm activated; or
    in response to the event alert being categorized in the third category that is different than each of the first category and the second category, the AI system concluding the communication, connecting the communication device to the queue of the response center in front of calls of the second category, and providing the identifying information and context of the communication to the response center while leaving the alarm activated.

8. A method, comprising
  receiving an event alert or a communication associated with an event alert from a communication device;
  receiving identifying information of the communication device or a corresponding user;
  triggering an alarm in response to the event alert, the alarm effective to initiate an in person check of the communication device or the corresponding user indicated by the identifying information if not deactivated within a predetermined amount of time;

an artificial intelligence (AI) system collecting additional information about at least one of the event alert, the communication device, or a user of the communication device; and in response to the collected additional information indicating the in person check is not necessary, the AI system deactivating the alarm within the predetermined amount of time and without involvement of a live person.

9. A method, comprising:

receiving an event alert or a communication associated with an event alert from a communication device;

an artificial intelligence (AI) system collecting additional information about at least one of the event alert, the communication device, or a user of the communication device;

categorizing the event alert into one category of a plurality of categories based on the collected additional information; and prioritizing subsequent handling of the event alert among other event alerts based on the category, including:
  in response to the category being a first category, connecting the communication device in a call to a back of a live operator queue of a response center; and
in response to the category being a second category different than the first category, connecting the communication device in a call to the live operator queue in front of calls for event alerts categorized in the first category.

* * * * *